United States Patent
Unruh

(10) Patent No.: US 7,624,328 B2
(45) Date of Patent: Nov. 24, 2009

(54) DATA ERROR DETECTION DURING MEDIA WRITE

(75) Inventor: Gregory A. Unruh, San Clemente, CA (US)

(73) Assignee: Quantum Corporation, San Jose, CA (US)

(*) Notice: Subject to any disclaimer, the term of this patent is extended or adjusted under 35 U.S.C. 154(b) by 521 days.

(21) Appl. No.: 11/198,011

(22) Filed: Aug. 4, 2005

(65) Prior Publication Data

US 2008/0172594 A1  Jul. 17, 2008

(51) Int. Cl.
*H03M 13/00* (2006.01)
(52) U.S. Cl. .................. 714/763; 714/755
(58) Field of Classification Search ........... 714/755, 714/763
See application file for complete search history.

(56) References Cited

U.S. PATENT DOCUMENTS

| 4,646,170 | A |   | 2/1987  | Kobayashi et al. |
| 4,929,946 | A | * | 5/1990  | O'Brien et al. ............. 341/87 |
| 5,200,962 | A | * | 4/1993  | Kao et al. ................. 714/774 |
| 5,263,030 | A |   | 11/1993 | Rotker et al. |
| 5,424,850 | A | * | 6/1995  | Inoue et al. ............... 386/100 |
| 5,430,579 | A | * | 7/1995  | Onishi et al. ............... 386/67 |
| 5,585,933 | A | * | 12/1996 | Ichige et al. ............... 386/109 |
| 5,627,995 | A | * | 5/1997  | Miller et al. ............... 711/171 |
| 5,867,112 | A | * | 2/1999  | Kost ........................... 341/51 |
| 6,009,547 | A |   | 12/1999 | Jaquette et al. |
| 6,195,024 | B1 | * | 2/2001 | Fallon ......................... 341/51 |
| 6,324,025 | B1 | * | 11/2001 | Arai et al. ..................... 360/8 |
| 7,307,552 | B2 | * | 12/2007 | Ma et al. ..................... 341/51 |

OTHER PUBLICATIONS

Fegreus, "An LTO-2 Drive with an Edge or Two", downloaded from http://www.open-mag.com/features/vol_103/LT02//LTO2.htm, Aug. 4, 2004, pp. 1-8.

* cited by examiner

*Primary Examiner*—Joseph D Torres
(74) *Attorney, Agent, or Firm*—Baker Botts L.L.P.

(57) ABSTRACT

Data error detection comprises storing in a first buffer data to be written to a medium and a first digital signature of the data. If the first digital signature matches a second digital signature of data read from the first buffer, a compressed form of data read from the first buffer is stored in a FIFO. If the first digital signature matches a third digital signature of an uncompressed form of the compressed data, the uncompressed form of the compressed data, a C2 ECC of a first C1 ECC of the uncompressed form of the compressed data, and one or more C1 ECCs comprising the first C1 ECC and a second C1 ECC of the C2 ECC are stored in a second buffer. Success is indicated if the one or more C1 ECCs match corresponding C1 ECCs calculated from data and C1 ECCs read from the second buffer, and if a C1 ECC of the data read from the second buffer and written to a medium matches a C1 ECC of corresponding data read back from the medium.

20 Claims, 4 Drawing Sheets

DATA ERROR DETECTION DURING MEDIA WRITE

FIELD OF THE INVENTION

The present invention relates to the field of computer science. More particularly, the present invention relates to data error detection during media write.

BACKGROUND OF THE INVENTION

In the field of magnetic tape recording, tape medium recording mechanisms typically do not detect data errors that occur during the various stages of preparing data to be recorded on a tape medium. Two of these stages are data processing and ECC parity generation. Hence, if errors occur during one or more of these stages, when a subsequent attempt is made to recover data from the tape medium, the recovered data is typically either found to be corrupt, or the errors remain undetected. If the recovered data is found to be corrupt, no data is returned to the host that requested data recovery. And if the errors remain undetected, incorrect data is returned to the host.

Accordingly, a need exists in the art for solution that provides improved data error detection for errors that occur during the various stages of preparing data to be recorded on a tape medium.

SUMMARY OF THE INVENTION

Data error detection comprises storing in a first buffer data to be written to a medium and a first digital signature of the data. If the first digital signature matches a second digital signature of data read from the first buffer, a compressed form of data read from the first buffer is stored in a FIFO. If the first digital signature matches a third digital signature of an uncompressed form of the compressed data, the uncompressed form of the compressed data, a C2 ECC of a first C1 ECC of the uncompressed form of the compressed data, and one or more C1 ECCs comprising the first C1 ECC and a second C1 ECC of the C2 ECC are stored in a second buffer. Success is indicated if the one or more C1 ECCs match corresponding C1 ECCs calculated from data and C1 ECCs read from the second buffer, and if a C1 ECC of the data read from the second buffer and written to a medium matches a C1 ECC of corresponding data read back from the medium.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
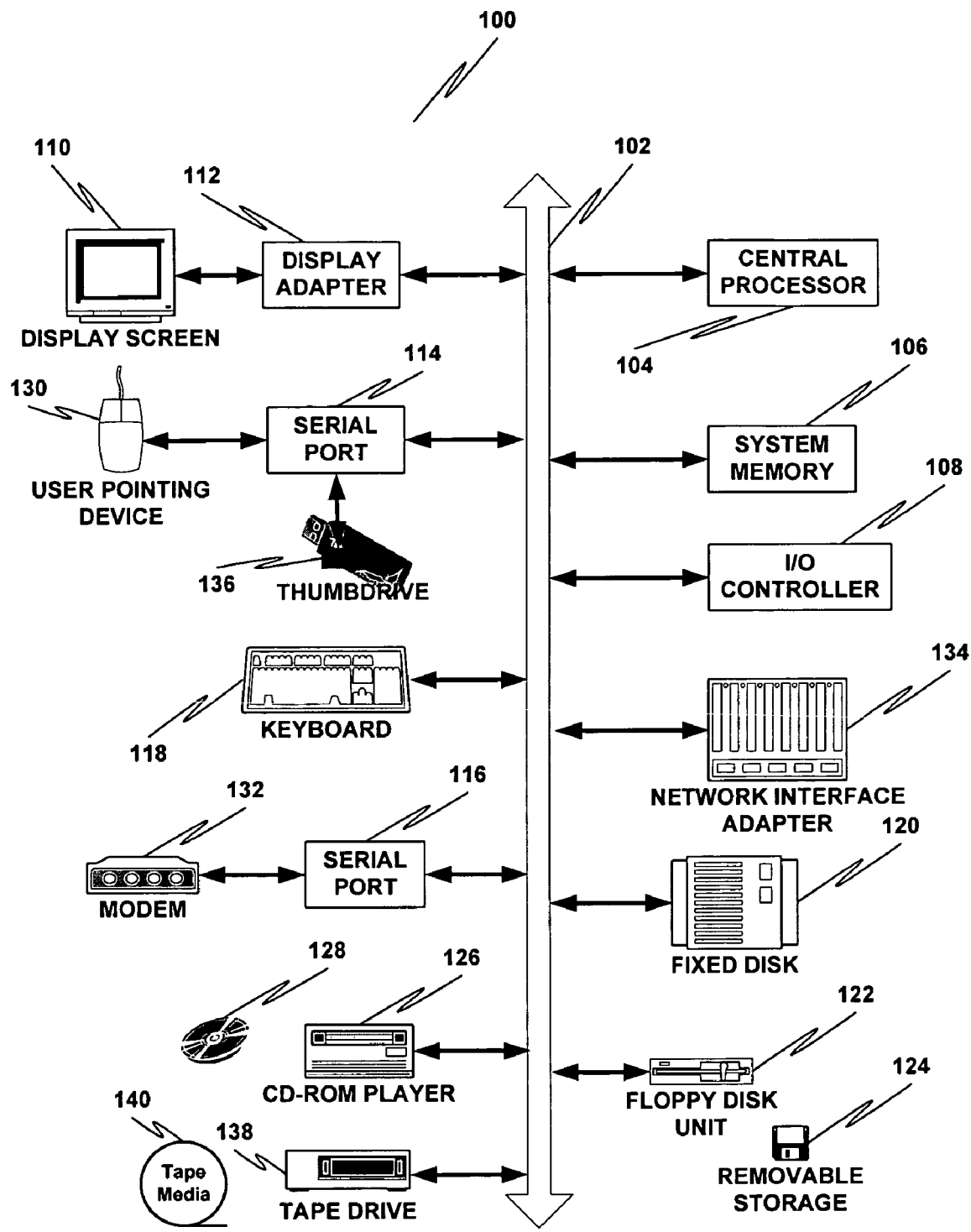
FIG. 1 is a block diagram that illustrates a computer system suitable for implementing aspects of the present invention.

Embodiments of the present invention are described herein in the context of a system and method for data error detection during media write. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), comprising field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a mobile device running an OS such as Windows® CE, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including MontaVista Software, Inc. of Sunnyvale, Calif., and FSMLabs, Inc. of Socorro, N.M. The method may also be implemented on a multiple-processor system, or in a computing environment comprising various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "digital signature" describes digital representation of the result of applying an algorithm for detecting one or more errors in a stored or transmitted sequence of bytes. A digital signature may comprise, by way of example, a cyclic redundancy check (CRC), a checksum, or a hash code.

In the context of the present invention, the term "Error Correction Code" (ECC) describes digital representation of the result of applying an algorithm for detecting and correcting one or more errors in a stored or transmitted sequence of bytes.

In the context of the present invention, the term "first-in-first-out" (FIFO) describes a storage mechanism in which the data stored for the longest time is retrieved first. A FIFO may be implemented in hardware, software, firmware, or a combination thereof.

FIG. 1 depicts a block diagram of a computer system 100 suitable for implementing aspects of the present invention. As shown in FIG. 1, computer system 100 comprises a bus 102 which interconnects major subsystems such as a central processor 104, a system memory 106 (typically RAM), an input/output (I/O) controller 108, an external device such as a display screen 110 via display adapter 112, serial ports 114 and 116, a keyboard 118, a fixed disk drive 120, a floppy disk drive 122 operative to receive a floppy disk 124, a CD-ROM player 126 operative to receive a CD-ROM 128, and a tape drive 138 operative to receive tape media 140. Many other devices can be connected, such as a pointing device 130 (e.g., a mouse) connected via serial port 114 and a modem 132 connected via serial port 116. Modem 132 may provide a direct connection to a remote server via a telephone link or to the Internet via a POP (point of presence). Alternatively, a network interface adapter 134 may be used to interface to a local or wide area network using any wired or wireless network interface system known to those skilled in the art (e.g., Infiniband, Ethernet, xDSL, AppleTalk™, IEEE 802.11, and Bluetooth®).

Many other devices or subsystems (not shown) may be connected in a similar manner. Also, it is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion. Code to implement the present invention may be operably disposed in system memory 106 or stored on storage media such as fixed disk 120, floppy disk 124, CD-ROM 128, thumbdrive 136, or tape media 140.

Figure 2:
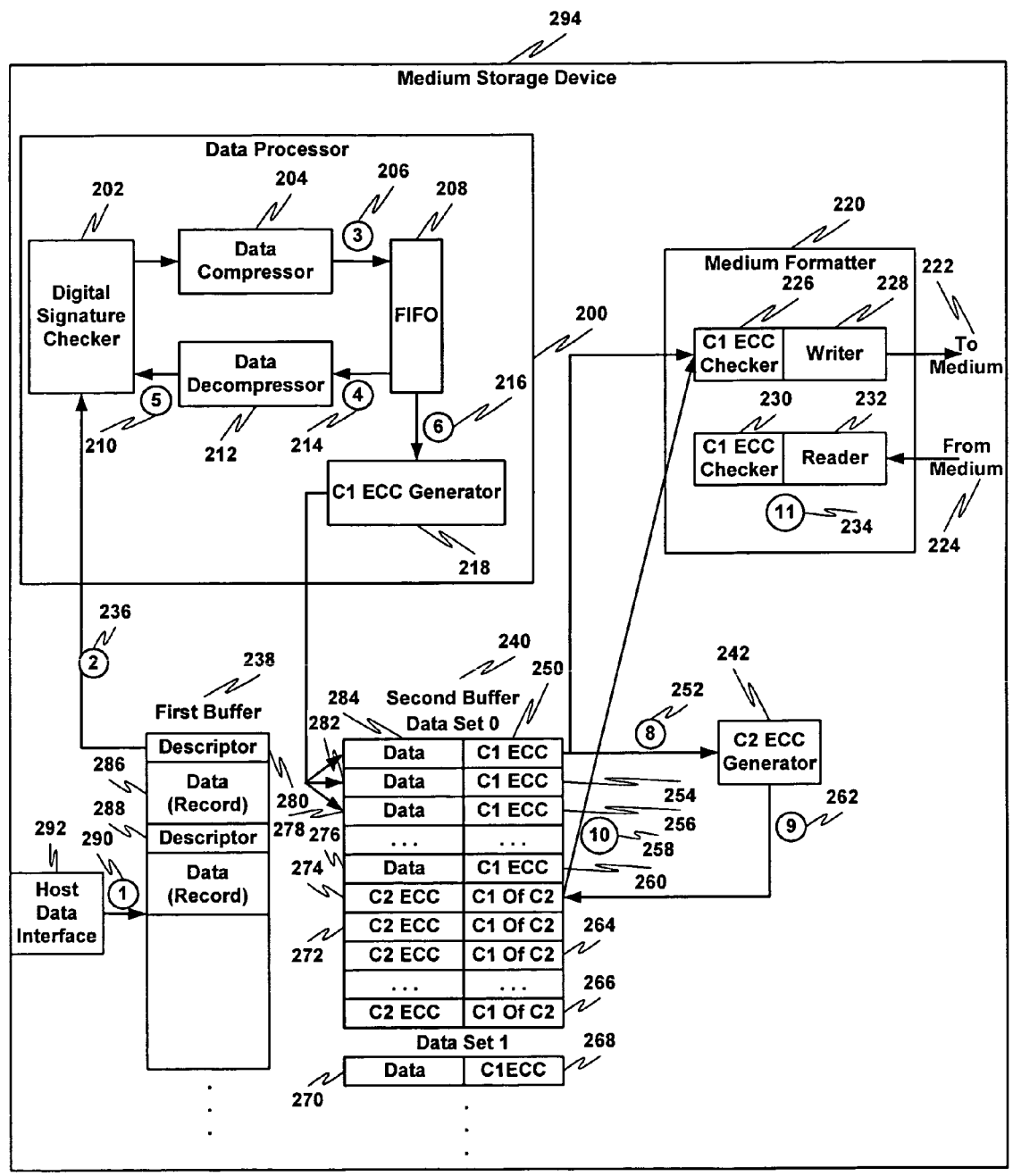
FIG. 2 is a block diagram that illustrates an apparatus for data error detection during media write, in accordance with one embodiment of the present invention.

Turning now to FIG. 2, a block diagram that illustrates an apparatus for data error detection during media write, in accordance with one embodiment of the present invention is presented. As shown in FIG. 2, medium storage device 294 comprises a data processor 200, a host data interface 292, a medium formatter 220, a C2 ECC generator 242, a first buffer 238, and a second buffer 240.

Host data interface 292 is adapted to receive data from a host, i.e. a computer system 100 controlled by central processor 104 as depicted in FIG. 1, and store both the received data and a digital signature of the received data in a first buffer 238. According to one embodiment of the present invention, host data interface 292 comprises a direct memory access (DMA) interface.

Data processor 200 is adapted to receive data from first buffer 238 and use record-level digital signature checks to detect errors in data read from the first buffer 238, or that result from application of a data compression algorithm. Data processor 200 is further adapted to store in a second buffer 240 the data (284, 282, 278, 276, 274, 272, 270), a C1 ECC of the data (250, 254, 256, 260), and a C1 ECC of C2 ECC data (264, 266). According to one embodiment of the present invention, the data (250, 254, 256, 260) plus C1 ECC (250, 254, 256, 260, 264, 266) is organized in rows of memory locations in the second buffer 240.

Data processor 200 comprises a digital signature checker 202, a data compressor 204, a data decompressor 212, a FIFO 208, and a C1 ECC Generator 218. Digital signature checker 202 is adapted to receive the data 286 and digital signature 280 from the first buffer 238 and calculate a second digital signature of the data read from the first buffer 238. Digital signature checker 202 is further adapted to, if the first digital signature matches the second digital signature, compress data from the first buffer 238, store the compressed data in a FIFO 208, uncompress the data stored in the FIFO 208, and calculate a third digital signature of the uncompressed data from the FIFO 208. If the first digital signature and the second digital signature do not match, or if the first digital signature and the third digital signature do not match, an error is indicated.

Still referring to FIG. 2, C1 ECC generator 218 is adapted to receive data from FIFO 208, calculate the C1 ECC of data from the FIFO 208, store data from the FIFO 208 and the calculated E1 ECC in the second buffer 240, and calculate and store the C1 ECC of the C2 ECC.

C2 ECC generator 242 is adapted to calculate the C2 ECC of the C1 ECC and store it in the second buffer 204. According to one embodiment of the present invention, data processor 200 comprises C2 ECC generator 242. According to another embodiment of the present invention, medium formatter 220 comprises C2 ECC generator 242.

Medium formatter 220 comprises a C1 ECC checker 226, a writer 228, a C1 ECC checker 230, and a reader 232. C1 ECC checker 226 is adapted to receive data, C2 ECCs, and C1 ECCs from the second buffer 240, and to calculate C1 ECC of data and C2 ECCs. Medium formatter 220 is further adapted to determine whether the calculated C1 ECCs match the C1 ECCs read from the second buffer 240. Medium formatter 220 is further adapted to indicate an error if no match is found. Medium formatter is further adapted to, if there is a match, write data to the medium, read the data back from the medium, and calculate the C1 ECC of the data read back from the medium. Medium formatter 220 is further adapted to indicate an error if the calculated C1 ECC does not match the C1 ECC calculated before the data was written to the medium.

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2.

According to one embodiment of the present invention, a medium comprises a serial medium. According to another embodiment of the present invention, a medium comprises a serial tape medium. According to another embodiment of the present invention, a medium comprises a serial magnetic tape medium.

According to another embodiment of the present invention, one or more of first buffer 238, second buffer 240, and FIFO 208 comprise separate portions of a single memory.

Figure 3:
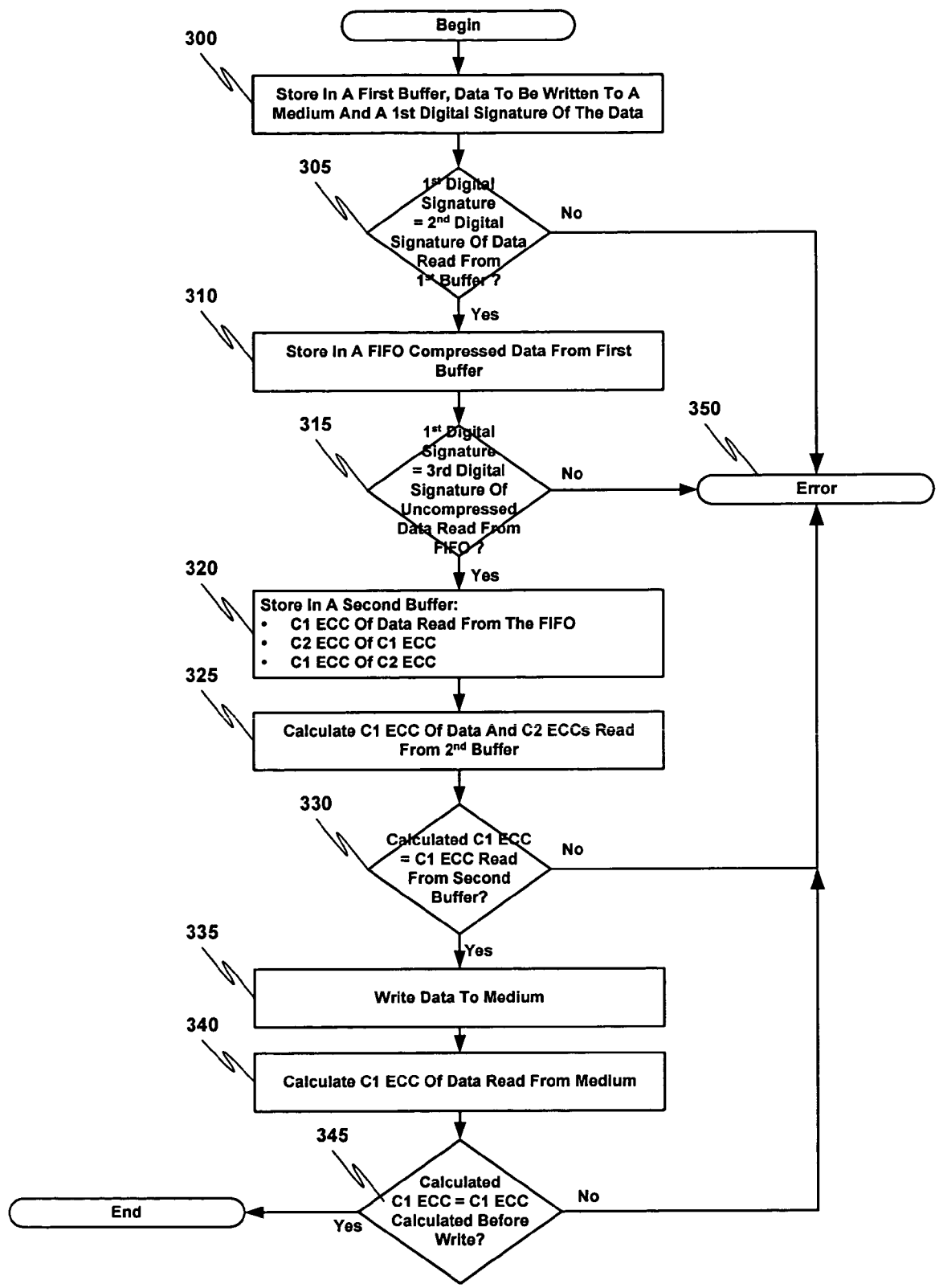
FIG. 3 is a high-level flow diagram that illustrates a method for data error detection during media write, in accordance with one embodiment of the present invention.

Turning now to FIG. 3, a high-level flow diagram that illustrates a method for data error detection during media write, in accordance with one embodiment of the present invention is presented. The processes illustrated in FIG. 3 may be performed by medium storage device 294 of FIG. 2. Furthermore, the processes illustrated in FIG. 3 may be implemented in hardware, software, firmware, or a combination thereof. At 300, data to be written to a medium and a first digital signature of the data are stored in a first buffer. At 305, a determination is made regarding whether the first digital signature matches a second digital signature of data read from the first buffer. If there is no match, an error is indicated at 350. If there is a match, at 310 the data from the first buffer is compressed and stored in a FIFO. At 315, a determination is made regarding whether the first digital signature matches a third digital signature of data read back from the FIFO and uncompressed. If there is no match, an error is indicated at 350. If there is a match, at 320 the following are stored in a second buffer: the C1 ECC of data read from the FIFO, the C2 ECC of the C1 ECC, and the C1 ECC of the C2 ECC. At 325, the C1 ECC of the data and the C2 ECCs read from the second buffer are calculated. At 330, a determination is made regarding whether the calculated C1 ECC matches the C1 ECC read from the second buffer. If there is no match, an error is indicated at 350. If there is a match, processing of the next data to be written to a medium may continue at 300.

Figure 4:
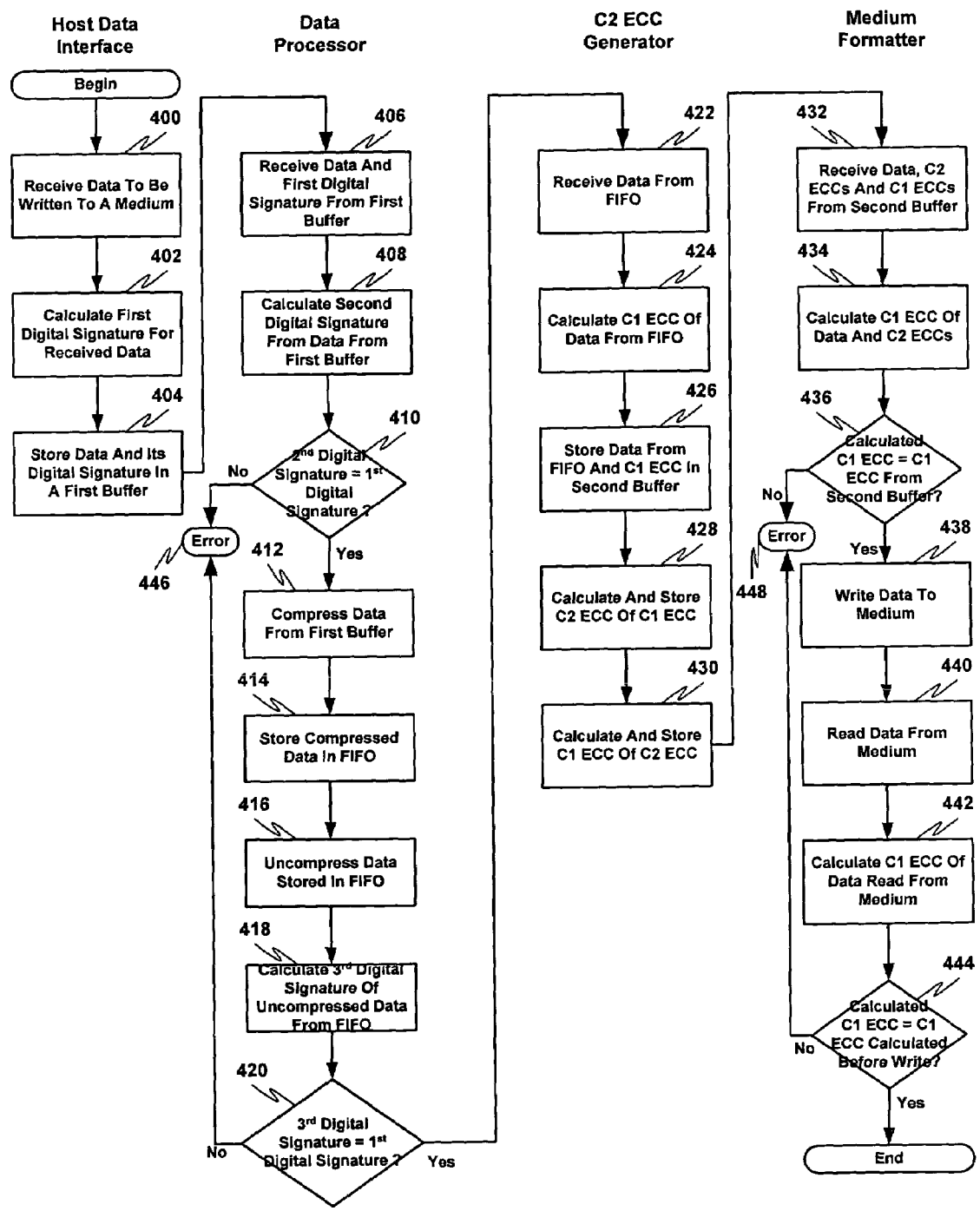
FIG. 4 is a low-level flow diagram that illustrates a method for data error detection during media write, in accordance with one embodiment of the present invention.

Turning now to FIG. 4, a low-level flow diagram that illustrates a method for data error detection during media write, in accordance with one embodiment of the present invention is presented. FIG. 4 provides more detail for FIG. 3. The processes illustrated in FIG. 4 may be performed by medium storage device 294 of FIG. 2. Furthermore, the processes illustrated in FIG. 4 may be implemented in hardware, software, firmware, or a combination thereof. At 400, data to be written to a medium is received. At 402, a first digital signature of the received data is calculated. At 404, the received data and the first digital signature are stored in a first buffer.

Still referring to FIG. 4, at 406, data and the first digital signature are received from the first buffer. At 408, a second digital signature of data from the first buffer is calculated. At 410, a determination is made regarding whether the second digital signature matches the first digital signature. If there is no match, an error is indicated at 446. If there is a match, data from the first buffer is compressed at 412. At 414, the compressed data is stored in a FIFO. At 416, the data stored in the FIFO is uncompressed. At 418, a third digital signature of the uncompressed data is calculated. At 420, a determination is made regarding whether the third digital signature matches the first digital signature. If there is no match, an error is indicated at 446. If there is a match, processing continues at 442.

Still referring to FIG. 4, at 422, data from the FIFO is received. At 424, the C1 ECC of data read from the FIFO is calculated. At 426, the data from the FIFO and the C1 ECC are stored in a second buffer. At 428, the C2 ECC of the C1 ECC is calculated and then stored in the second buffer. At 430, the C1 ECC of the C2 ECC is calculated and then stored in the second buffer.

Still referring to FIG. 4, at 432, data, C2 ECCs, and C1 ECCs are received from the second buffer. At 434, the C1 ECC of the data from the second buffer, and the C2 ECCs, are calculated. At 436, a determination is made regarding whether the calculated C1 ECC matches the C1 ECC from the second buffer. If there is no match, an error is indicated at 448. If there is a match, at 438, the data is written to the medium. At 440, the data is read back from the medium. At 442, the C1 ECC of the data read back from the medium is calculated. At 444, a determination is made regarding whether the calculated C1 ECC of the data read back from the medium matches the C1 ECC calculated before the write operation. If there is no match, an error is indicated at 448. If there is a match, data has been successfully written to the medium. Processing of the next data continues at 400.

As shown above, embodiments of the present invention use linear CRC/ECC codes, so that the C1 of the C2 ECC bytes is the same as the C2 of the C1 ECC bytes. By computing C1 as data is put into the second buffer 240, computing C2 across both Data and C1, and then checking C1 of both Data and C2 ECC "rows", an error is detected if any of the data in the second buffer 240 is corrupted, or if there was an error in the C2 ECC process.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. Logic encoded in a tangible medium for execution, the logic comprising computer-readable instructions operative, when executed, to cause a processor to:
   store in a first buffer data to be written to a medium and a first digital signature of said data;
   if said first digital signature matches a second digital signature of the data read from said first buffer, store in a FIFO a compressed form of data read from said first buffer;
   if said first digital signature matches a third digital signature of an uncompressed form of said compressed form of the data read from said first buffer, store in a second buffer:
      said uncompressed form of said compressed form of the data read from said first buffer;
      a C2 ECC of a first C1 ECC of said uncompressed form of said compressed form of the data read from said first buffer; and
      one or more C1 ECCs, comprising said first C1 ECC and a second C1 ECC of said C2 ECC; and
   if said one or more C1 ECCs match corresponding C1 ECCs calculated from data and C1 ECCs read from said second buffer, indicate a successful write if a C1 ECC of said data read from said second buffer and written to a medium matches a C1 ECC of corresponding data read back from said medium.

2. The logic of claim 1 wherein said digital signature comprises a cyclic redundancy check (CRC).

3. The logic of claim 1 wherein said digital signature comprises a checksum.

4. The logic of claim 1 wherein said digital signature comprise a hash code.

5. The logic of claim 1 wherein two or more of said first buffer, said second buffer, and said FIFO comprise separate portions of a single memory.

6. The logic of claim 1 wherein said medium comprises a serial medium.

7. The logic of claim 6 wherein said serial medium comprises a serial tape medium.

8. The logic of claim 7 wherein said serial tape medium comprises a serial magnetic tape medium.

9. The logic of claim 1, further comprising computer-readable instructions further operative to cause the processor to indicate an error if said first digital signature does not match said second digital signature of data read from said first buffer.

10. The logic of claim 1, further comprising computer-readable instructions further operative to cause the processor to indicate an error if said first digital signature does not match a third digital signature of said uncompressed form of said compressed form of the data read from said first buffer, or if said one or more C1 ECCs do not match said corresponding C1 ECCs calculated from said data and C1 ECCs read from said second buffer.

11. A method for data error detection, the method comprising:
- storing in a first buffer data to be written to a medium and a first digital signature of said data;
- if said first digital signature matches a second digital signature of the data read from said first buffer, storing in a FIFO a compressed form of the data read from said first buffer;
- if said first digital signature matches a third digital signature of an uncompressed form of said compressed form of the data read from said first buffer, storing in a second buffer:
  - said uncompressed form of said compressed form of the data read from said first buffer;
  - a C2 ECC of a first C1 ECC of said uncompressed form of said compressed form of the data read from said first buffer; and
  - one or more C1 ECCs, comprising said first C1 ECC and a second C1 ECC of said C2 ECC; and
- if said one or more C1 ECCs match corresponding C1 ECCs calculated from data and C1 ECCs read from said second buffer, indicating a successful write if a C1 ECC of said data read from said second buffer and written to a medium matches a C1 ECC of corresponding data read back from said medium.

12. The method of claim 11 wherein said digital signature comprises a cyclic redundancy check (CRC).

13. The method of claim 11 wherein said digital signature comprises a checksum.

14. The method of claim 11 wherein said digital signature comprise a hash code.

15. The method of claim 11 wherein two or more of said first buffer, said second buffer, and said FIFO comprise separate portions of a single memory.

16. The method of claim 11 wherein said medium comprises a serial medium.

17. The method of claim 16 wherein said serial medium comprises a serial tape medium.

18. The method of claim 17 wherein said serial tape medium comprises a serial magnetic tape medium.

19. The method of claim 11, further comprising indicating an error if said first digital signature does not match said second digital signature of data read from said first buffer.

20. The method of claim 11, further comprising indicating an error if said first digital signature does not match a third digital signature of said uncompressed form of said compressed form of the data read from said first buffer, or if said one or more C1 ECCs do not match said corresponding C1 ECCs calculated from said data and C1 ECCs read from said second buffer.

* * * * *